Dec. 18, 1934.  W. D. TAYLOR  1,984,902
LEAF SPRING
Filed July 30, 1932
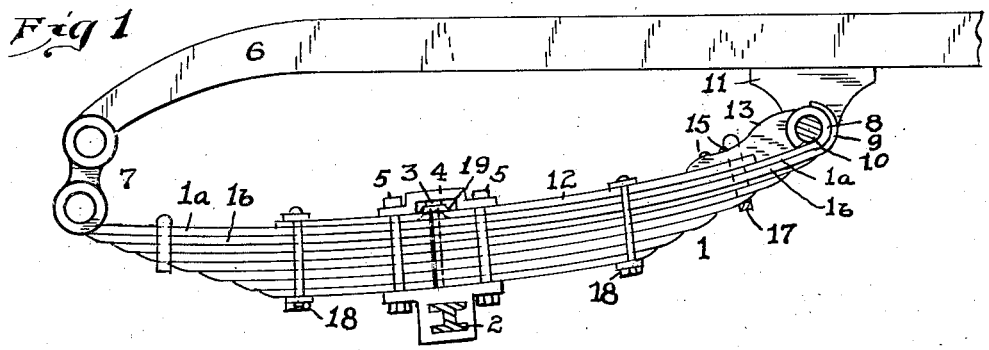
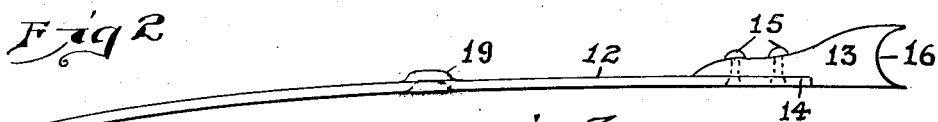
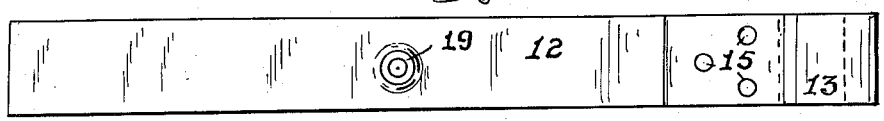
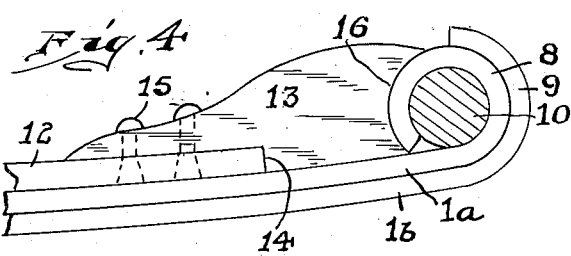
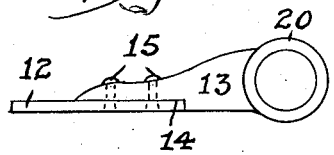
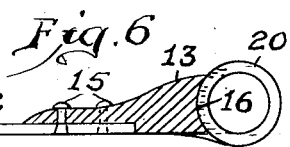
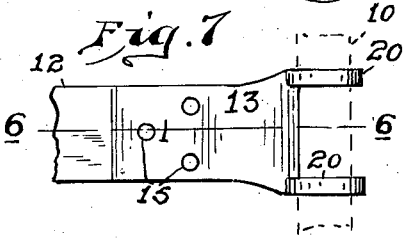

Patented Dec. 18, 1934

1,984,902

UNITED STATES PATENT OFFICE 1,984,902

LEAF SPRING

William Duncan Taylor, Aspinwall, Pa.

Application July 30, 1932, Serial No. 626,395

5 Claims. (Cl. 267—47)

My invention relates to leaf springs which are largely used for cushioning the travel of vehicles of all kinds, portable structures, portable machinery and the like.

In modern practice the leaf spring is connected at an intermediate point to the axle and one end of the spring is attached by a shackle while the other end of the spring has a fixed pivot attachment usually termed "the fixed eye".

In the case of a front spring, the fixed eye may be either at the front or rear end of the spring, while in the case of a rear spring the fixed eye is at the front end of the spring. In connection with my invention the fixed eye of the front spring is assumed to be at the rear end of the spring.

Again in modern practice it is common to employ the top leaves of the springs as the only direct connection between the axle and the vehicle frame, thus doing away with radius rods and like connections.

Again in modern practice the brakes are applied to all four wheels.

In the case of the front spring, when the brakes are applied to the front wheels the top plates of the spring and the fixed eyes must resist torque, and where the wheel passes over a bump or obstruction a thrust is transferred along the top leaf to the fixed eye. The result is a tendency to bow the spring upwardly between the axle and the fixed eye and to open the fixed eye, due to the torque and to the pressure exerted against the front side of the fixed eye.

In the case of rear spring, when the brakes are applied to the rear wheels the top leaves and the fixed eyes have to resist torque, and the tendency is for the spring to rotate downwardly between the axle and the fixed eye and for the other leaves to separate from the top leaf. This results in downward pressure on the top leaf which is solely resisted by the fixed eye.

In driving the vehicle, the top leaf assumes the entire duty of delivering the driving power from the axle to the vehicle frame and body.

In both of these cases the tendency is to open, fracture or break the fixed eye.

The torque and thrust exerted on the fixed eyes is, of course, greatly increased where no radius rods are provided and all strains are carried by the springs.

The result is that either the springs break between the axles and the fixed eyes or the fixed eyes are either fractured, broken or spread open.

Where any one of these accidents occur in the case of a front spring, it is no longer possible to safely steer the vehicle, and in the case of a rear spring it is no longer possible to drive the vehicle.

The object which I have in view is the provision of practical means for relieving the fixed eyes of all torque and thrust strains so that their fracture, breaking or opening will be prevented.

Another object which I have in view is the provision of practical means whereby in case the fixed eye of a front spring becomes broken or opened, the vehicle may still be safely steered, and where such an accident occurs in the case of a rear spring, the vehicle may still be safely driven.

I accomplish these objects by applying to the springs a novel appliance in the nature of a spring steel plate which acts as a flexible torque-thrust bar, and which is superimposed on the top leaf of the spring, one end of the plate being secured to the spring at the axle connection while the other end is provided with an arcuate surface which bears and fits snugly against the exterior perimetral surface of the fixed eye. Thus all torque and thrusts are carried directly from the axle to the pivot bolt of the fixed eye without imposing the strain on the latter, and should the fixed eye become broken or open, the vehicle may still be safely steered where the accident happens to a front spring, and where the accident happens to the rear spring the vehicle may still be safely driven.

Other novel features of construction and also of arrangement of parts will appear from the following description.

In the accompanying drawing wherein I have illustrated a practical embodiment of the principles of my invention, Fig. 1 is a side elevation of a leaf spring and its mounting.

Fig. 2 is a side elevation of my improved torque-thrust bar before it is installed in the spring.

Fig. 3 is a top plan view of the same.

Fig. 4 is an enlarged detail in side elevation showing the head of the torque-thrust bar and its assembled relation with the fixed eye of the spring.

Fig. 5 is a broken side elevation of the torque-thrust bar showing a modification.

Fig. 6 is section taken along the line 6—6 in Fig. 7.

Fig. 7 is a plan view of the structure of Fig. 5.

Referring first to Figs. 1, 2, 3, and 4 of the drawing, 1 represents a leaf spring composed of a plurality of leaves. The top leaf of the spring is indicated at 1a and the second leaf at 1b. The spring is shown secured intermediate of its ends to the axle 2 or other support as by the center bolt 3, the cap plate 4 and the clamping bolts 5.

One end of the spring, the front end of the front spring and the rear end of the rear spring, is connected to the vehicle frame 6 by the shackle 7. At the other end of the spring the top leaf 1a is bent to form an eye 8 and as a reinforcement to the eye 8 the end of the second leaf 1b is preferably brought up and partially wrapped around the eye 8 as illustrated at 9.

10 represents the pivot bolt which extends through the eye 8 and connects it to the clevis bracket 11 which is attached to the frame 6.

12 represents my torque-thrust bar, the body of which is formed of a flat length of spring steel, preferably of the same width as that of the top leaf 1a.

One end of the bar 12 is provided with an enlarged head 13 which is preferably a casting having its under side cut away as at 14 to receive the end portion of the bar 12, the bar and the head being permanently connected together as by rivets 15.

The outer end of the head 13 is provided with an arcuate bearing surface 16 formed of the proper radius to fit snugly against and mate with the outer perimetral surface of the fixed eye 8. To enable the parts to be assembled the bearing surface 16 should be somewhat less than semi-circular. Thus the arcuate bearing surface extends above and below the horizontal plane of the axis of the fixed eye.

The outer spring clip 17 clamps the head 13 and the bar 12 to the spring and on either side of the axle the intermediate spring clips 18 clamp the bar 12 to the spring. The bar 12 is provided with a hole for the center bolt 3 and at their bolt holes the bar 12 and the top plate 1a are cupped upwardly at as 19, the cup of the top plate being seated in the cup of the arm 12.

Thus when the center bolt is tightened and the cap plate 4 is clamped down, any thrust or torque transferred to the axle will be carried directly by the bar 12 to the pivot bolt 10 without exerting any such torque or strain on the eye 8. The only force applied to the eye in such cases is that of compression between the head 13 and the bolt 10.

The bar 12 is given a camber which is opposite to that of the spring as illustrated in Fig. 2, so that when the bar is bolted and clipped in place on the spring the head 13 will be held snugly in mating contact with the perimetral surface of the eye 8 at all times, regardless of the deflection distance or position of the spring.

It is obvious that the eye 8 is thus relieved and protected from all torque and thrust strains and functions only as a pivotal connection for the end of the spring. Should the eye become fractured or opened the head 13 would still retain the portion of the eye in place between it and the bolt 10, and thus would hold the spring in place until the vehicle could complete its journey or be driven to a convenient place for repairs. The bar will also support the spring for temporary and emergency use in case one or more of the spring leaves become fractured.

Again, the bar acts to cushion rebounds on the spring and thus adds to the efficiency of the spring.

The installation of my torque-thrust bar does not require any change or redesigning of any of the original equipment of the vehicles to which it is applied.

Referring now to Figs. 5, 6 and 7 of the drawing, it will be noted that the head 13 of the bar 12 is provided with a pair of integral eyes 20 which extend past the bearing surface 16 on either side of the latter so as to be axially alined with the eye 8 of the top leaf of the spring. Thus when the pivot bolt 10 indicated in dotted lines in Fig. 7 is inserted in place it extends through the two eyes 20 in addition to the eye 8, and thus, in case the eye 8 becomes broken or opened, the spring will still function as the bearing surface 16 will hold the top leaf in place and the eyes 20 will provide the necessary pivotal connection for the end of the spring until repairs can be conveniently made.

This modified form of my invention may be advantageously used in cases where the clevis is considerably wider than the eye on the end of the top leaf of the spring. It is also useful in giving a further margin of safety when the second leaf of the spring is not wrapped about the eye.

I claim:—

1. For use in connection with a leaf spring secured intermediate of its ends to an axle and having one of its ends provided with a fixed eye connection, means for relieving the spring and the fixed eye of torque and thrust comprising a plate of spring-steel held in superimposed relation to the top leaf of the spring and connected by the center bolt to the axle and having its end provided with an arcuate bearing surface which is held in mating engagement with the fixed eye of the spring, said arcuate bearing surface extending above the horizontal plane of the axis of the fixed eye, the plate and the top leaf of the spring having interengaging portions to relieve the center bolt of strains.

2. For use in connection with a leaf spring secured intermediate of its ends to an axle and having one of its ends provided with a fixed eye connection, means for relieving the spring and the fixed eye of torque and thrust comprising a plate of spring-steel held in superimposed relation to the top leaf of the spring and connected by the center bolt to the axle and having its end provided with an arcuate bearing surface which is held in mating engagement with the fixed eye of the spring, said arcuate bearing surface extending above the horizontal plane of the axis of the fixed eye, the plate and the top leaf of the spring having interengaging cupped portions to relieve the center bolt of strains.

3. For use in connection with a leaf spring secured intermediate of its ends to an axle and having a fixed eye connection for one of its ends, means for relieving the spring and the fixed eye of torque and thrust comprising a spring-metal plate superimposed on the top leaf of the spring and having one portion fixed relative to the axle and having an end provided with an arcuate bearing surface compressed into mating engagement with the perimetral surface of the fixed eye of the spring, said arcuate bearing surface extending above the horizontal plane of the axis of the fixed eye, and said end being also provided with an eye alined with the fixed eye of the spring to receive the pivot bolt.

4. For use in connection with a leaf spring secured intermediate of its ends to an axle and having a fixed eye connection for one of its ends, means for relieving the spring and the fixed eye of torque and thrust comprising a spring-metal plate superimposed on the top leaf of the spring and having one portion fixed relative to the axle and having an end provided with an arcuate bearing surface compressed into mating engagement with the perimetral surface of the fixed eye of the spring, said arcuate bearing surface extending above the horizontal plane of the axis of the fixed eye, and said end being also provided with a pair of eyes on either side of the fixed eye and alined therewith to receive the pivot bolt.

5. In a vehicle spring, the combination with a laminated spring having a main leaf, an eye attachment at one end and an axle connection spaced therefrom, of a thrust plate having an opposite camber to that of the main leaf of the spring, means for clamping the thrust plate in continuous surface contact with the main leaf between the eye attachment and the axle connection, one end of the thrust plate being provided with an arcuate surface which forcibly bears against the curved surface of the eye when the thrust plate is clamped in position, and means for securing the other end of the thrust plate at the axle connection of the spring.

WILLIAM DUNCAN TAYLOR.